March 9, 1943. W. N. VAN DRANEN 2,313,304
FILTER CARD
Filed March 29, 1940
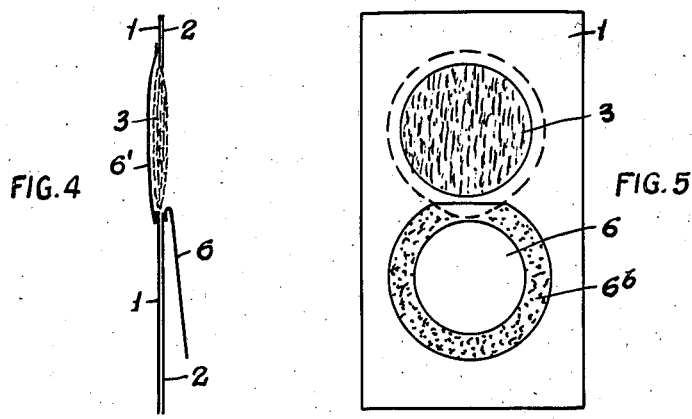
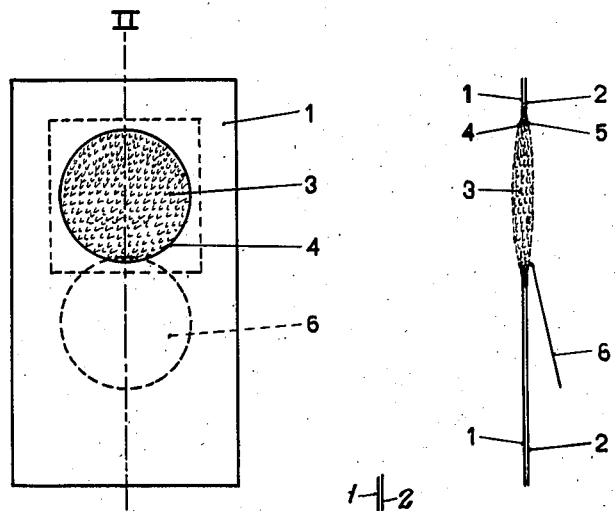
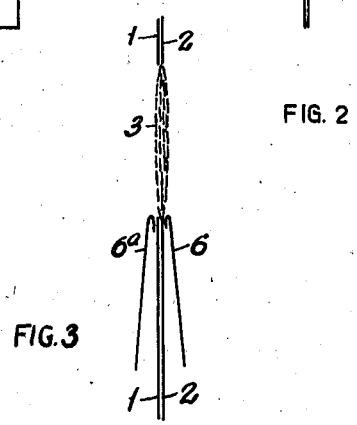
Inventor,
W. N. Van Dranen
By: Glascock Downing & Seebold
Attys.

Patented Mar. 9, 1943

2,313,304

UNITED STATES PATENT OFFICE 2,313,304

FILTER CARD

Willem Nicolaas van Dranen, De Bilt, Netherlands; vested in the Alien Property Custodian Application March 29, 1940, Serial No. 326,773
In the Netherlands April 5, 1939

3 Claims. (Cl. 73—51)

This invention relates to a filter card particularly for testing and determining the condition of milk.

It is well known to use wadding discs in apparatus for determining the condition of milk, said discs being replaced for every sample of milk to be tested. The use of such wadding discs being inconvenient as they readily tear, it is also well known to use filter cards, comprising a strip of paper having an opening therein and a filter material such as wadding securely mounted on the strip and over the opening therein. A well known form of such filter cards comprises a card of paper of at least two layers having an opening therein the layer of filter material being securely mounted between the layers of the card and over the opening therein.

The use of said filter cards has shown a disadvantage in that the judgment with the eye of the filter samples in order to determine the degree of pollution of the tested liquid is in a notable degree dependent on the background against which the samples are inspected.

The object of the invention is to eliminate said disadvantage and according to the invention the filter card is provided with a lip which can be folded down in such a way that the lip when folded down completely covers the layer of filter material such as wadding. The lip of every filter card having the same colour and thickness as for instance a strip of white paper, the samples now all can be judged against the same standard background and thereby the determination of the condition of the tested liquid such as milk is much more convenient and accurate.

According to the invention filter cards comprising a card of paper of at least two layers may be provided at both sides with a lip which can be folded down in such a way that the lips when folded down completely cover the layer of the filter material at both sides. In this way it is possible to compare every sample with two standard backgrounds of different colour and thickness.

According to the invention both lips may be of greater size than the layer of filter material and may be provided with glued margins in such a way that the lips when folded down may be gummed at the paper, fully closing up the layer of the filter. After such closing up the filter paper with the tested layer can easily be sealed for instance with inspector pincers.

The drawing illustrates an embodiment of the invention.

Figure 1 is a front view of a filter card.

Figure 2 is a cross-sectional view taken on line II—II of Figure 1.

Figure 3 is a view similar to Fig. 2 showing a modification of the invention with two lips both folded back to expose the filter material.

Figure 4 is a view similar to Fig. 3 showing one of the lips operatively positioned with respect to the filter material.

Figure 5 is a front view of a form of filter card in which the lip is provided with a coating of adhesive material.

Between two layers of paper 1 and 2 and over their circular openings 4 and 5 a layer of filter material 3 is securely mounted. Layer 2 is provided with a paper lip 6 of circular form, which can be folded down in such a way, that the layer of filter material 3 is completely covered. In this folded down position the lip forms a standard-background for the examination of the layer of filter material, which has been exposed to a flow of liquid and has caught dirt and other pollutions of the tested liquid.

In the modification of the invention illustrated in Figs. 3, 4 and 5 the card is provided with two lips 6 and 6a thus affording means whereby it is possible to compare every sample with two standard backgrounds of different color and thickness. As shown in Fig. 5 the lip 6 is of greater size than the filter material 3 and the marginal portion thereof is provided with a coating 6b of adhesive material whereby the lips may be caused to adhere to the layers of paper 1 and 2.

As will be evident to those skilled in the art, this invention permits of various modifications without departing from the spirit thereof or the scope of the appended claims.

Having now particularly described and ascertained the nature of my said invention and in what manner the same is to be performed, I declare that what I claim is:

1. A filter card particularly for testing and determining the condition of milk comprising a strip of paper having an opening therein and a filter material securely mounted on the strip and over the opening therein, and a lip which can be folded down in such a way that the lip when folded down completely covers the layer of filter material and forms a background for the milk undergoing test.

2. A filter card particularly for testing and determining the condition of milk comprising a card of paper of at least two layers and having an opening therein and a layer of filter material securely mounted between the layers of the card and over the opening therein, and a lip on each side of the card which can be folded down in such a way that the lips when folded down completely cover the layer of the filter material, each of said lips, when folded down, forming a background for the milk undergoing test.

3. A filter card particularly for testing and determining the condition of milk comprising a card of paper having an opening therein and a filter material securely mounted on the card and over the opening therein, and a lip on each side of the card which can be folded down in such a way that the lips when folded down completely cover the layer of the filter material, the lips being provided with glued margins so that the lips when folded down can be gummed at the card completely closing up the filter material, each of said lips, when folded down forming a background for the milk undergoing test.

WILLEM NICOLAAS van DRANEN.